(12) United States Patent
Berry et al.

(10) Patent No.: US 9,356,551 B2
(45) Date of Patent: May 31, 2016

(54) METHOD AND APPARATUS FOR CONTROLLING AN ELECTRIC MOTOR EMPLOYED TO POWER A FLUIDIC PUMP

(71) Applicant: GM GLOBAL TECHNOLOGY OPERATIONS LLC, Detroit, MI (US)

(72) Inventors: Daniel J. Berry, Macomb Township, MI (US); Paul F. Turnbull, Canton, MI (US); Chia-Chou Yeh, Gardena, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 458 days.

(21) Appl. No.: 13/756,455

(22) Filed: Jan. 31, 2013

(65) Prior Publication Data
US 2014/0210392 A1    Jul. 31, 2014

(51) Int. Cl.
*F04D 15/02* (2006.01)
*H02P 31/00* (2006.01)
*H02P 29/00* (2016.01)

(52) U.S. Cl.
CPC ............ *H02P 31/00* (2013.01); *H02P 29/0044* (2013.01); *F04B 2205/06* (2013.01); *F04B 2205/10* (2013.01); *F04B 2205/11* (2013.01)

(58) Field of Classification Search
CPC ............ F04B 2205/06; F04B 2205/10; F04B 2205/11; F04C 2210/206; F04C 2270/025; F04C 2270/225; F04D 15/02; F04D 15/0263
USPC .......................................................... 417/32
See application file for complete search history.

(56) References Cited

U.S. PATENT DOCUMENTS

| | | | | |
|---|---|---|---|---|
| 8,435,015 | B2 * | 5/2013 | Brookbank et al. | 417/369 |
| 8,482,237 | B2 * | 7/2013 | Berry et al. | 318/471 |
| 2010/0150739 | A1 * | 6/2010 | Brookbank et al. | 417/53 |
| 2012/0007532 | A1 | 1/2012 | Baglino et al. | |
| 2012/0226483 | A1 | 9/2012 | Berry et al. | |

* cited by examiner

*Primary Examiner* — Patrick Hamo

(57) ABSTRACT

An electric motor powers a fluidic pump fluidly connected to a hydraulic circuit. Operating the electric motor includes determining a heat transfer coefficient for the electric motor based upon a temperature of hydraulic fluid in the hydraulic circuit. A temperature of the electric motor is determined based upon the heat transfer coefficient. Operation of the electric motor is controlled based upon the temperature of the electric motor.

16 Claims, 3 Drawing Sheets

METHOD AND APPARATUS FOR CONTROLLING AN ELECTRIC MOTOR EMPLOYED TO POWER A FLUIDIC PUMP

TECHNICAL FIELD

This disclosure is related to electric motors and more specifically to electric motors employed to power fluidic pumps.

BACKGROUND

The statements in this section merely provide background information related to the present disclosure. Accordingly, such statements are not intended to constitute an admission of prior art.

Fluidic pumps include a pump element that couples to and is powered by a torque-generative device, e.g., an electric motor. Fluidic pumps provide fluid flow to a hydraulic circuit, with such flow resulting in pressure in the hydraulic circuit due to flow resistance. An electric motor generates heat during operation. Excess heat buildup in an electric motor can decrease its service life.

SUMMARY

An electric motor powers a fluidic pump fluidly connected to a hydraulic circuit. Operating the electric motor includes determining a heat transfer coefficient for the electric motor based upon a temperature of hydraulic fluid in the hydraulic circuit. A temperature of the electric motor is determined based upon the heat transfer coefficient. Operation of the electric motor is controlled based upon the temperature of the electric motor.

BRIEF DESCRIPTION OF THE DRAWINGS

One or more embodiments will now be described, by way of example, with reference to the accompanying drawings, in which:

FIGS. 5-1 and 5-2 illustrate processes for employing a temperature of the hydraulic fluid, line pressure in the hydraulic circuit, and pump motor speed to determine effect on heat transfer coefficient(s) employed in a thermal model, in accordance with the disclosure.

DETAILED DESCRIPTION

Figure 1:
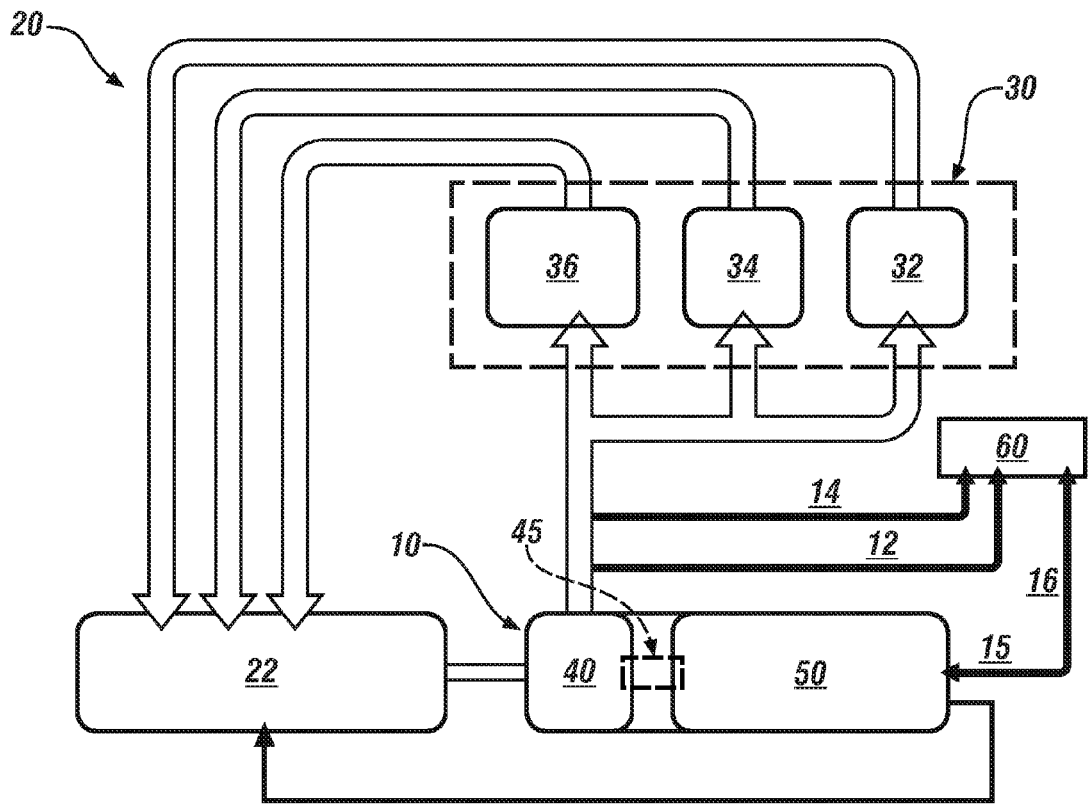
FIG. 1 illustrates a system for providing pressurized hydraulic fluid to a hydraulic circuit, in accordance with the disclosure.

Referring now to the drawings, wherein the showings are for the purpose of illustrating certain exemplary embodiments only and not for the purpose of limiting the same, FIG. 1 schematically illustrates an embodiment of a system for providing pressurized hydraulic fluid to a hydraulic circuit 20. In one embodiment the hydraulic fluid is automatic transmission fluid. The hydraulic circuit 20 includes a fluidic pump 10 including a pump element 40 rotatably coupled via a coupler 45 to an electric motor 50. A controller 60 monitors parameters and controls operation of the electric motor 50, including generating an operating command signal 15 for controlling the fluidic pump 10 to achieve an operating parameter, e.g., a preferred or desired hydraulic pressure in the hydraulic circuit 20. The electric motor 50 operates in response to the command signal 15, which can be any suitable motor control signal. In operation, the fluidic pump 10 draws hydraulic fluid from a sump 22 and generates pressurized hydraulic fluid that is transferred to one or a plurality of hydraulic elements 30 of the hydraulic circuit 20. By way of a non-limiting example, the hydraulic circuit 20 is employed on a vehicular powertrain system to provide pressurized hydraulic fluid to hydraulic elements 30 including a clutch activation circuit 32, a transmission lubrication circuit 34, and an electric traction motor cooling system 36. The hydraulic circuit 20 may be employed on other systems without limitation. Monitored parameters associated with operation of the hydraulic circuit 20 preferably include hydraulic fluid temperature 12, hydraulic pressure 14 in the hydraulic circuit 20, and rotational speed 16 of the electric motor 50. The rotational speed 16 of the electric motor 50 can be determined using a back-emf signal from the command signal 15 or another suitable rotational speed determination method.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals during ongoing operation.

Figure 2:
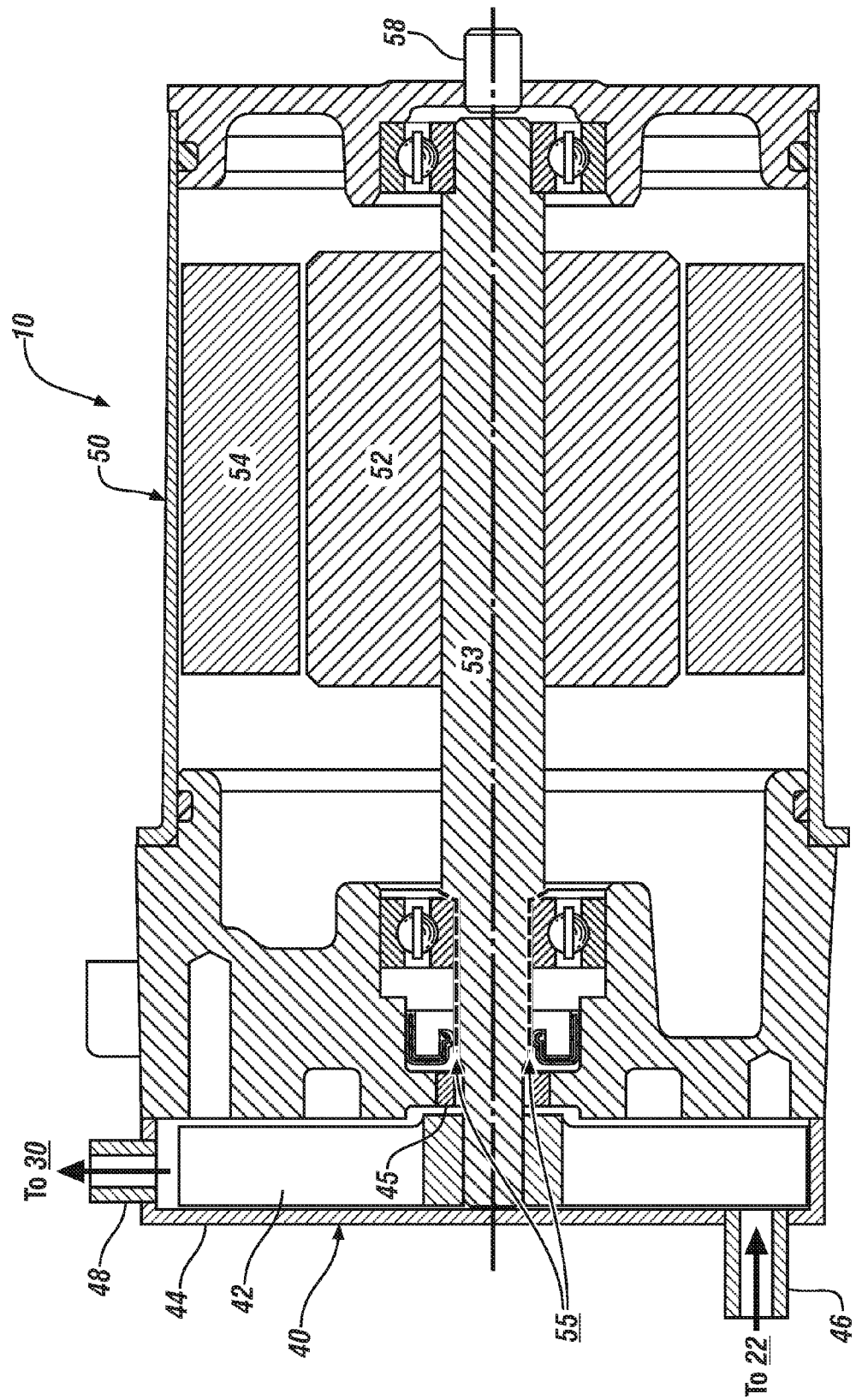
FIG. 2 illustrates a fluidic pump including a pump element and an electric motor, in accordance with the disclosure.

FIG. 2 illustrates an embodiment of the fluidic pump 10 including pump element 40 and electric motor 50. The pump element 40 includes an impeller 42 that fixedly attaches to a shaft 53 of the electric motor 50 and rotates therewith. The impeller 42 is contained in and rotates within a pump body 44 that includes an inlet or suction port 46 and a discharge port 48. The inlet port 46 fluidly couples with the sump 22 and the discharge port 48 fluidly couples with the hydraulic circuit 20. The pump element 40 is preferably a positive-displacement pump element, meaning that volumetric flowrate of the hydraulic fluid out the discharge port 48 is constant for a given rotational speed regardless of the pressure at the discharge port 48. The electric motor 50 includes a rotor 52 coupled to shaft 53 and a stator 54, and may be any suitable electric motor configuration, e.g., a three-phase AC motor that is an induction motor, a permanent magnet motor, or another configuration. Coupler 45 inserts around the shaft 53 between the pump element 40 and the electric motor 50 and acts as a controlled leak path between the pump body 44 and the electric motor 50. The coupler 45 may be in the form of a bushing, a roller bearing, or another suitable coupling device. The controlled leak path feature of the coupler 45 permits formation of leak paths 55. The leak paths 55 permit a portion of the hydraulic fluid flowing through the pump element 40 to flow through the coupler 45 into the electric motor 50. The hydraulic fluid that flows through the coupler 45 impinges on the rotor 52 and other elements of the electric motor 50 to effect cooling thereof. The hydraulic fluid flows through the electric motor 50 to a drain 58 that is distal to the pump element 40. The drain 58 preferably fluidly connects to the sump 22.

The temperature of the electric motor 50 of the fluidic pump 10 is affected by heat transfer to the hydraulic fluid passing through the coupler 45 and impinging on the electric motor 50 including the rotor 52. The magnitude of heat transfer between the electric motor 50 and the hydraulic fluid relates to the flowrate of the hydraulic fluid that passes through the coupler 45 and impinges on the rotor 52. The flowrate of the hydraulic fluid that passes through the coupler 45 relates to the hydraulic fluid temperature 12, hydraulic pressure 14 in the hydraulic circuit 20, and rotational speed 16 of the electric motor 50. For example, the flowrate of the hydraulic fluid passing through the coupler 45 decreases at low hydraulic fluid temperatures due to increased viscosity.

An accurate understanding of the operating temperature of the electric motor is desirable for executing controls related to managing operation to prevent operating the electric motor in excess of design temperatures as such operation can adversely affect service life of the electric motor. Overall, a process is described for controlling an electric motor that is operatively coupled to and employed to power a hydraulic pump that is configured to supply pressurized hydraulic fluid to hydraulic circuit, e.g., for a hybrid powertrain transmission for hydraulic clutch activation, transmission lubrication, and torque motor cooling. This process includes determining operating parameters that preferably include a rotational speed of the electric motor, fluidic temperature, and hydraulic fluid pressure that is output from the hydraulic pump. A leakage flowrate from the hydraulic pump to the electric motor is determined based upon the temperature and the pressure of hydraulic fluid from the hydraulic pump, and a heat transfer coefficient is determined based upon the leakage flowrate, the rotational speed of the electric motor, and the temperature of the hydraulic fluid from the hydraulic pump. A temperature of the electric motor can be determined based upon the heat transfer coefficient. Operation of the hydraulic pump and the system employing the hydraulic circuit can be controlled in response.

Figure 3:
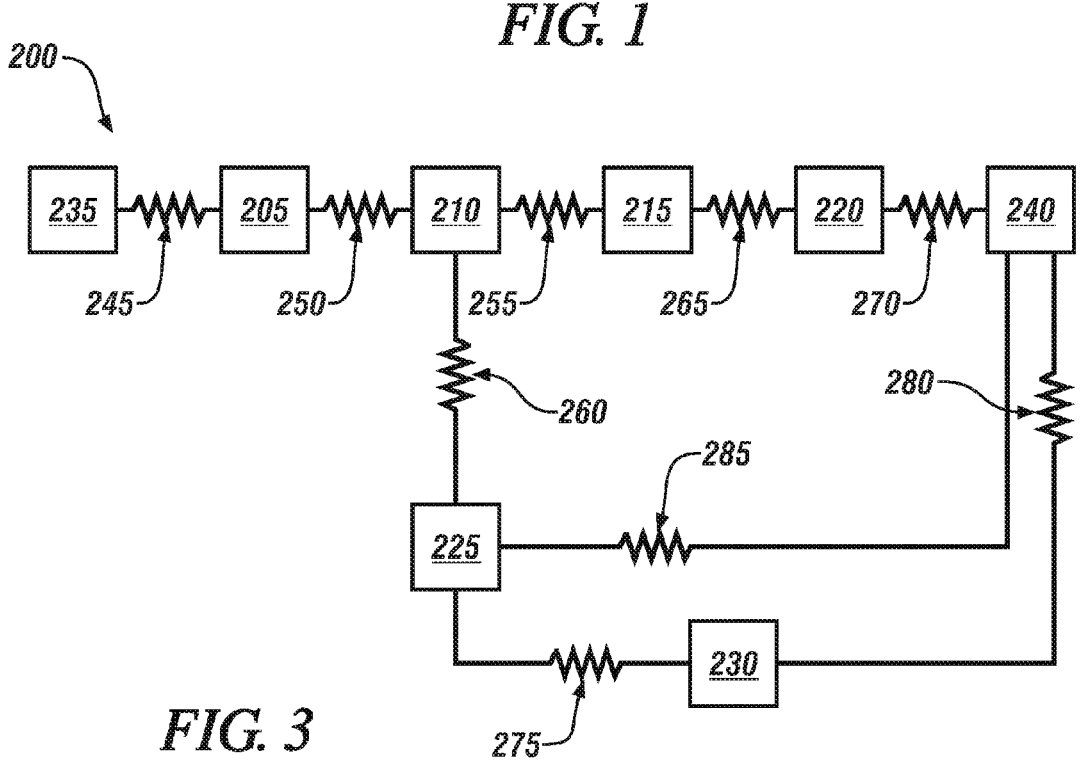
FIG. 3 illustrates a thermal model for estimating temperature of one embodiment of an electric motor of the fluidic pump, in accordance with the disclosure.

FIG. 3 schematically shows a thermal model 200 for estimating temperature of electric motor 50 of the fluidic pump 10. One exemplary thermal model of the motor 50 includes identifying heat transfer paths between the identified regions of the motor 50. The identified regions of the motor 50 may each be associated with a node and the identified heat transfer paths may each be associated with a thermal resistance that is characterized by a heat transfer coefficient. Additionally, an energy balance equation may be derived for each node that considers, e.g., the operating conditions of the motor 50, the physical characteristics of the components used in the motor 50, thermal loss regions of the motor 50, and other factors. As shown, the electric motor 50 is a permanent magnet motor. The thermal model 200 is deployed as one or more algorithms and calibrations that are executed in an on-board controller. As illustrated, the thermal model 200 includes eight nodes representing the temperature of various regions of the motor 50 based upon specific operating conditions and boundary conditions. More or fewer regions of the pump 10, motor 50 and/or boundary conditions may be considered.

The thermal model 200 includes a plurality of identified regions of the motor 50 including a plurality of nodes that are connected by a plurality of heat transfer paths. Each heat transfer path has an associated thermal resistance that can be characterized using a heat transfer coefficient. An energy balance equation is preferably derived for each node and considers the operating conditions of the motor 50, the physical characteristics of the components used in the motor 50, thermal loss regions of the motor 50, and other factors. The thermal model 200 may be implemented in a controller as one or more machine-executable energy balance equations, such as one or more first-order differential equations. The heat transfer paths can include conductive, convective and/or radiant heat transfer paths.

In one embodiment of the thermal model 200, specific nodes represent regions of the stator 54 and other nodes represent regions of the rotor 52. A temperature is determined at each node. For example a first stator node 205 may represent temperature at a non-flux producing region of the stator 54 (e.g., a stator iron). A second stator node 210 may represent temperature at a flux producing region of the stator 54 (e.g., the stator iron). A third stator node 215 may represent temperature of conductive cable used in the windings of the stator 54, such as the conductive cable disposed between slots defined by the stator 54. A fourth stator node 220 may represent temperature of the end-turns of the conductive cable used in the windings of the stator 54. A first rotor node 225 may represent temperature from the permanent magnets used by the rotor 52. A second rotor node 230 may represent temperature from a non-flux producing region of the rotor 52 (e.g., a rotor iron). Additional nodes represent other regions of interest of the motor 50 independent of the stator 54 and the rotor 52, including temperature of the hydraulic fluid used in the motor 50. In one embodiment, a first hydraulic fluid node 235 may represent the temperature of the hydraulic fluid in one region of the motor 50 and a second hydraulic fluid node 240 may represent the temperature of the hydraulic fluid in another region of the motor 50. The temperatures of the hydraulic fluid may be determined by direct measurement, estimation, prediction, or other suitable mechanization(s) and/or method(s).

The conductive, convective and/or radiant heat transfer paths are represented as thermal resistances between the nodes. By way of example, a first thermal resistance 245 may represent convective external heat transfer between the regions represented by the first hydraulic fluid node 235 and the first stator node 205. A second thermal resistance 250 may represent conduction between the regions represented by the first stator node 205 and the second stator node 210 via, e.g., a stator stack. A third thermal resistance 255 may represent conduction between the regions represented by the second stator node 210 and the third stator node 215 via, e.g., the stator stack, conductive cable windings, and an insulation system. A fourth thermal resistance 260 may represent heat transfer through, e.g., an air gap between the regions represented by the second stator node 210 and the first rotor node 225. A fifth thermal resistance 265 may represent conduction through conductive cable windings between the regions represented by the third stator node 215 and the fourth stator node 220. A sixth thermal resistance 270 may represent convection between the regions represented by the fourth stator node 220 and the second hydraulic fluid node 240, e.g., from the hydraulic fluid to the end-turns of the stator 54. A seventh thermal resistance 275 may represent conduction through the rotor core between the regions represented by the first rotor node 225 and the second rotor node 230. An eighth thermal resistance 280 may represent the heat transfer path between the second rotor node 230 and the second hydraulic fluid node 240 caused by convection from the hydraulic fluid to the hub of the rotor 52. A ninth thermal resistance 285 may represent convection between the second hydraulic fluid node 240 and the first rotor node 225 (e.g., rotor end-rings). Each of the aforementioned thermal resistances can be represented by a heat transfer coefficient, with each of the thermal resistances and corresponding heat transfer coefficients determined experimentally, analytically, or employing another suitable method. One or more of the aforementioned thermal resistances may be influenced by temperature of leaked hydraulic fluid, thus affecting temperatures at the various nodes. Determining one of the thermal resistances and corresponding heat transfer coefficients of a representative electric motor as influenced by temperature of leaked hydraulic fluid is described herein.

Figure 4:
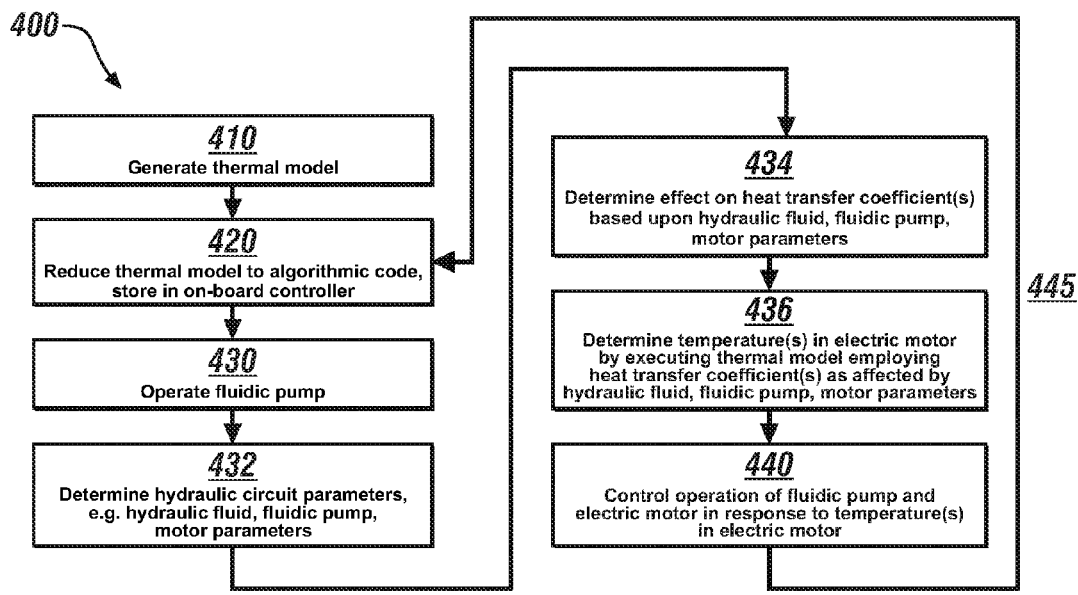
FIG. 4 illustrates a process for estimating temperature(s) at one or more nodes of an electric motor in real-time employing a thermal model, in accordance with the disclosure.

FIG. 4 is a flowchart of a process 400 for estimating temperature(s) at one or more nodes of an embodiment of the electric motor 50 in real-time employing an embodiment of the thermal model 200 described with reference to FIG. 3. This process 400 for estimating temperature(s) at one or more nodes of the motor 50 considers operating conditions of the motor 50 and physical characteristics of the components of the motor 50, as previously described with reference to FIG. 3. Furthermore, this process allows for the effect of changes in temperature of the hydraulic fluid that affects temperature of one or more of the nodes of the motor 50 due to any change in one or more of the heat transfer coefficients of the thermal model 200. Table 1 is provided as a key to FIG. 4, wherein the numerically labeled blocks and the corresponding functions are set forth as follows.

TABLE 1

| BLOCK | BLOCK CONTENTS |
|---|---|
| 410 | Generate thermal model |
| 420 | Reduce thermal model to algorithmic code and store in on-board controller |
| 430 | Operate fluidic pump including electric motor |
| 432 | Determine hydraulic circuit parameters including, e.g., hydraulic fluid, fluidic pump, and motor parameters |
| 434 | Determine effect on heat transfer coefficient(s) based upon hydraulic fluid, fluidic pump and motor parameters |
| 436 | Determine temperature(s) in electric motor by executing thermal model employing the heat transfer coefficient(s) as affected by the hydraulic fluid, fluidic pump and motor parameters |
| 440 | Control operation of the fluidic pump and electric motor in response to the temperature(s) in the electric motor |

A thermal model of the fluidic pump 10 including electric motor 50 is generated, which includes identifying one or more regions of motor elements, e.g., the rotor 52 and stator 54, that generate, transfer or sink heat during operation (410). An example of a schematic drawing employed in developing a thermal model of a fluidic pump including an electric motor is shown with reference to FIG. 3. The thermal model may be expressed as one or more energy balance equations that can be in the form of first-order differential equations that include one or a plurality of heat transfer coefficients. The thermal model including the energy balance equations defining the temperature at each node and the heat transfer coefficients is reduced to machine-executable code and stored in a memory device for execution by an on-board controller (420).

Figures 1, 5:
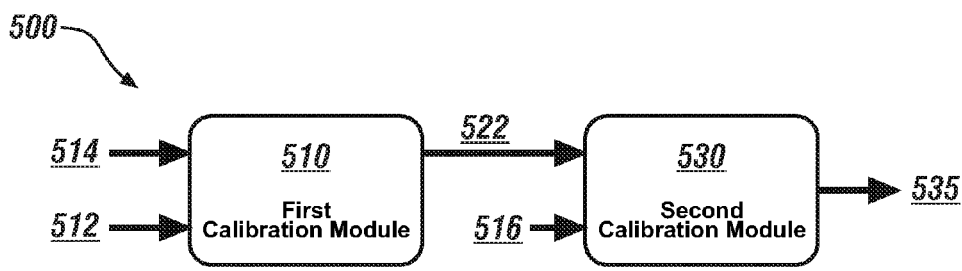
Figures 2, 5:
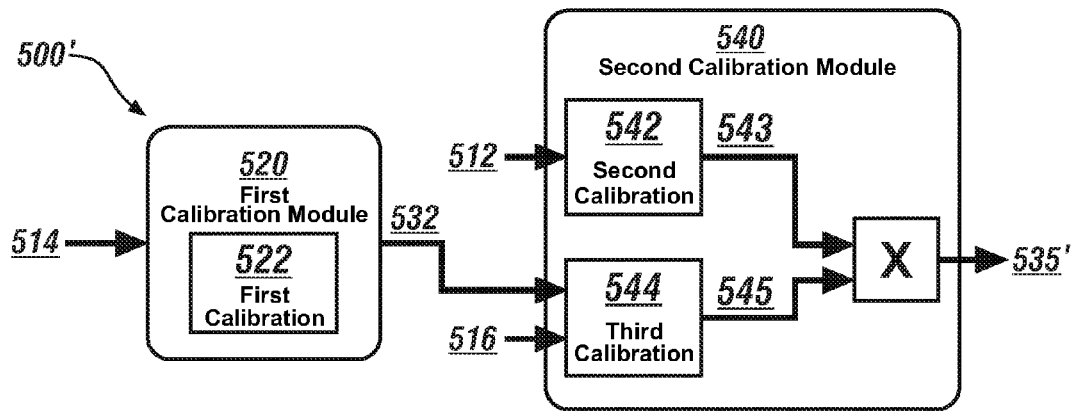

During ongoing system operation, the fluidic pump operates to provide pressurized hydraulic fluid into a hydraulic circuit (430), and hydraulic circuit parameters associated with such operation are determined Such parameters preferably include temperature of the hydraulic fluid, line pressure in the hydraulic circuit, and pump motor speed (432). The parameters including the temperature of the hydraulic fluid, line pressure in the hydraulic circuit, and pump motor speed are employed to determine effect on the heat transfer coefficient(s) (434). FIGS. 5-1 and 5-2 illustrate processes for employing the temperature of the hydraulic fluid, line pressure in the hydraulic circuit, and pump motor speed to determine effect on the heat transfer coefficient(s). The thermal model is executed to determine a temperature at a single one of the nodes, or to determine temperatures at a plurality of the nodes in the fluidic pump employing the heat transfer coefficient(s) as affected by the hydraulic fluid, fluidic pump and motor parameters (436). Executing the thermal model includes executing the energy balance equations to solve the energy balance equation for each node, thus determining the temperature at each of the nodes. This may include solving each energy balance equation at two or more time steps to determine a change in temperature at each node over time. In one embodiment, the temperatures at multiple nodes may be combined using a suitable temperature model of the electronic to determine a composite temperature for the electric motor.

Operation of the fluidic pump and electric motor are controlled in response to the temperature(s) at the nodes in the electric motor (440). This can include maintaining operation of the fluidic pump and electric motor in response to commanded operating parameters for hydraulic pressure and flow in the hydraulic circuit when the temperatures at the nodes in the electric motor are within a predetermined allowable range of temperatures. This can include controlling operation of the electric motor and fluidic pump in response to commanded operating parameters for hydraulic pressure and flow in the hydraulic circuit when the temperature at a predetermined selected one of the nodes in the electric motor is within a predetermined allowable range of temperatures. In one embodiment, the temperatures at multiple nodes in the electric motor may be employed and compared to corresponding predetermined allowable ranges of temperatures for those nodes. In one embodiment, temperature at one the nodes in the electric motor may be employed and compared to a predetermined allowable range of temperatures for that node. In one embodiment, a composite temperature for the electric motor can be compared to a predetermined allowable range of temperatures for the electric motor.

When temperature at one or more of the nodes in the electric motor is outside, i.e., either greater than or less than a corresponding predetermined allowable range of temperatures, operation of the electric motor may be derated, which includes limiting electric power consumption by the electric motor by limiting a maximum electric current draw or a maximum electric voltage, resulting in derated hydraulic pressure and/or flow in the hydraulic circuit. When the hydraulic circuit is subjected to derated hydraulic pressure and/or flow, the system on which the hydraulic circuit operates is also derated. This may result in derated operation such as reduced maximum clutch torque capacity due to derated hydraulic pressure.

As indicated, the foregoing process is repetitively executed (445), with the fluidic pump operating to provide pressurized hydraulic fluid into a hydraulic circuit (430). Thus, operation of the electric motor may be derated only during such time as when the temperature at one of the nodes in the electric motor is outside, i.e., either greater than or less than the predetermined allowable range of temperatures. When the temperatures at all of the nodes in the electric motor are within the corresponding predetermined allowable ranges of temperatures due to a change in conditions, the electric motor is permitted to operate to across its full operating range.

FIGS. 5-1 and 5-2 illustrate processes for employing the temperature of the hydraulic fluid, line pressure in the hydraulic circuit, and pump motor speed to determine one or more heat transfer coefficient(s) in an exemplary system.

FIG. 5-1 shows a first process 500 to determine one or more heat transfer coefficient(s), with input parameters of hydraulic fluid temperature 512, hydraulic pressure 514, and pump speed 516. A first calibration module 510 is employed to determine a pump leakage flowrate 522 based upon the fluid temperature 512 and hydraulic pressure 514 in the hydraulic circuit. A second calibration module 530 is employed to determine the heat transfer coefficient(s) 535 based upon the pump leakage flowrate 522 and the pump speed 516. The heat transfer coefficient(s) 535 can be employed in a thermal model to determine a temperature at one or more of the nodes in the electric motor.

FIG. 5-2 shows a second process 500' to determine one or more heat transfer coefficient(s) 535', with input parameters of hydraulic fluid temperature 512, hydraulic pressure 514, and pump speed 516. A first calibration module 520 includes a first calibration 522 that is employed to determine a pump leakage flowrate 532 based upon the hydraulic pressure 514 in the hydraulic circuit. A second calibration module 540 includes a second calibration 542 and a third calibration 544 that are employed to determine the heat transfer coefficient(s) 535' based upon the pump leakage flowrate 532, the fluid temperature 512 and the pump speed 516. This includes employing the third calibration 544 to determine a raw heat transfer coefficient 545 based upon the pump leakage flowrate 532 and the pump speed 516. The final heat transfer coefficient(s) 535' is determined by adjusting the raw heat transfer coefficient 545 with a flow multiplier 543. The flow multiplier 543 is determined based upon the fluidic temperature 512 employing the second calibration 542.

In one embodiment, the first calibration 522 is in the form of a one-dimensional searchable calibration table stored in a memory device that may be interrogated by a controller executing the aforementioned process, with the magnitudes of pressure 514 and flow 532 that are contained in the calibration table being developed in an off-line environment using a representative system. The first calibration 522 may be in the form of the searchable table, an algorithm, or another suitable machine-executed implementation of a calibration. Table 2 shows an embodiment of the first calibration 522, and includes an indication of leakage flowrate 532 through a fluidic pump element to an electric motor in response to hydraulic pressure 514, as follows.

TABLE 2

| Line Pressure (kPa) | Leakage Flow (L/m) |
|---|---|
| 0 | 0 |
| 200 | 0.04 |
| 500 | 0.1 |
| 1000 | 0.2 |
| 1500 | 0.3 |

The first calibration 522 is employed to determine a pump leakage flowrate 532 based upon the hydraulic pressure 514 in the hydraulic circuit. When implemented in practice as a table, the second process 500' linearly interpolates between the calibration elements of the first calibration 522 in Table 2 to determine magnitude of the pump leakage flowrate 532 based upon the hydraulic pressure 514 over the range of the hydraulic pressure 514 in the hydraulic circuit.

In one embodiment, the second calibration 542 is in the form of a one-dimensional searchable calibration table stored in a memory device that may be interrogated by a controller executing the aforementioned process, with the magnitudes of fluidic temperature 512 and multiplier 543 that are contained in the calibration table being developed in an off-line environment using a representative system. The second calibration 542 may be in the form of the searchable table, an algorithm, or another suitable machine-executed implementation of a calibration. Table 3 shows an embodiment of the second calibration 542, and includes an indication on relative heat transfer, i.e., multiplier 543 in relation to the fluidic temperature 512, as follows.

TABLE 3

| Temperature (° C.) | Multiplier |
|---|---|
| −40 | 0.5 |
| −20 | 0.5 |
| 0 | 0.7 |
| 20 | 0.7 |
| 40 | 0.7 |
| 60 | 0.8 |
| 90 | 1.0 |
| 120 | 1.2 |

In one embodiment, the third calibration 544 is in the form of a two-dimensional searchable calibration table stored in a memory device that may be interrogated by a controller executing the aforementioned process, with the magnitudes of leakage flowrate 532 and motor speed 516 that are contained in the calibration table being developed in an off-line environment using a representative system. The third calibration 544 may be in the form of the searchable table, an algorithm, or another suitable machine-executed implementation of a calibration. Table 4 shows an embodiment of the third calibration 544, and includes an indication of a raw heat transfer coefficient 545 in relation to the leakage flowrate 532 and the motor speed 516, as follows. As shown the raw heat transfer coefficient 545 is a heat transfer coefficient associated with a stator end turn of the electric motor.

TABLE 4

| | | Leakage Flowrate [L/m] | | | | | |
|---|---|---|---|---|---|---|---|
| | | 0.000 | 0.025 | 0.050 | 0.100 | 0.200 | 0.300 |
| Motor Speed [RPM] | 0 | 2 | 18 | 37 | 74 | 147 | 221 |
| | 100 | 2 | 18 | 37 | 74 | 147 | 221 |
| | 250 | 2 | 18 | 37 | 74 | 147 | 221 |
| | 500 | 2 | 24 | 49 | 98 | 195 | 292 |
| | 1000 | 2 | 30 | 60 | 121 | 242 | 362 |
| | 1500 | 2 | 30 | 60 | 121 | 242 | 362 |
| | 2000 | 2 | 42 | 84 | 168 | 336 | 504 |
| | 2500 | 2 | 72 | 144 | 287 | 574 | 861 |
| | 3000 | 2 | 72 | 144 | 287 | 574 | 861 |
| | 3500 | 2 | 72 | 144 | 287 | 574 | 861 |
| | 4000 | 2 | 88 | 175 | 350 | 700 | 1050 |
| | 5000 | 2 | 114 | 228 | 455 | 910 | 1365 |
| | 6000 | 2 | 122 | 245 | 490 | 980 | 1470 |

When implemented in practice as a table, the second process 500' employs linear interpolation to determine magnitude of the raw heat transfer coefficient 543 based upon the pump leakage flowrate 532 and the motor speed 516 shown in Table 4. The heat transfer coefficients shown in Table 4 can be determined based upon system parameters that are monitored, estimated, predicted or otherwise determined. The heat transfer coefficient(s) 535' can be employed in a thermal model to determine a temperature at one or more of the nodes in the electric motor.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for operating an electric motor employed to power a fluidic pump fluidly connected to a hydraulic circuit, comprising:
   determining a heat transfer coefficient for the electric motor based upon a temperature of hydraulic fluid in the hydraulic circuit, comprising;
      determining a leakage flowrate from the fluidic pump to the electric motor based upon the temperature of the hydraulic fluid and hydraulic pressure in the hydraulic circuit; and
      determining the heat transfer coefficient based upon the leakage flowrate;
   determining a temperature of the electric motor based upon the heat transfer coefficient; and
   controlling operation of the electric motor based upon the temperature of the electric motor.

2. The method of claim 1, wherein determining the heat transfer coefficient for the electric motor further comprises:
   determining the heat transfer coefficient based upon a rotational speed of the hydraulic pump; and
   adjusting the heat transfer coefficient based upon the temperature of the hydraulic fluid.

3. The method of claim 2, wherein adjusting the heat transfer coefficient comprises:
   determining a flow multiplier based upon the temperature of the hydraulic fluid; and
   adjusting the heat transfer coefficient based upon the flow multiplier.

4. The method of claim 1, wherein controlling operation of the electric motor comprises derating operation of the electric motor when the temperature of the electric motor is outside of a predetermined temperature range.

5. The method of claim 1, wherein determining the temperature of the electric motor comprises executing a thermal model employing said heat transfer coefficient.

6. The method of claim 5, wherein the temperature of the electric motor comprises a temperature at a predetermined region of the electric motor.

7. The method of claim 5, wherein the temperature of the electric motor comprises temperatures at a plurality of nodes of the electric motor.

8. The method of claim 7, wherein executing the thermal model further comprises determining a composite temperature for the electric motor based upon the temperatures at the plurality of nodes of the electric motor.

9. Method for operating an electric motor employed to power a fluidic pump fluidly connected to a hydraulic circuit, comprising:
   determining a rotational speed of the electric motor;
   determining a temperature and a pressure of hydraulic fluid output from the fluidic pump;
   determining one of a plurality of heat transfer coefficients for the electric motor based upon the rotational speed of the electric motor and the temperature and pressure of hydraulic fluid output from the fluidic pump, comprising;
      determining a leakage flowrate from the fluidic pump to the electric motor based upon the temperature of the hydraulic fluid and the pressure of hydraulic fluid output from the fluidic pump; and
      determining said one of the heat transfer coefficients based upon the leakage flowrate;
   determining a temperature of the electric motor based upon the heat transfer coefficients; and
   controlling operation of the electric motor based upon the temperature of the electric motor.

10. The method of claim 9, wherein determining one of the heat transfer coefficients further comprises:
   determining said one of the heat transfer coefficients based upon the rotational speed of the hydraulic pump; and
   adjusting said one of the heat transfer coefficients based upon the temperature of the hydraulic fluid.

11. The method of claim 10, wherein adjusting the raw heat transfer coefficient comprises:
   determining a flow multiplier based upon the temperature of the hydraulic fluid; and
   adjusting said one of the heat transfer coefficients based upon the flow multiplier.

12. The method of claim 9, wherein controlling operation of the electric motor comprises derating operation of the electric motor when the temperature of the electric motor is outside of a predetermined temperature range.

13. The method of claim 9, wherein determining the temperature of the electric motor comprises executing a thermal model employing said one of the heat transfer coefficients.

14. The method of claim 13, wherein executing the thermal model employing said one of the heat transfer coefficients to determine the temperature of the electric motor comprises executing the thermal model employing said one of the heat transfer coefficients to determine temperature at a predetermined region of the electric motor.

15. The method of claim 13, wherein executing the thermal model employing said one of the heat transfer coefficients to determine the temperature of the electric motor comprises executing the thermal model employing said one of the heat transfer coefficients to determine temperatures at a plurality of nodes of the electric motor.

16. The method of claim 13, wherein executing the thermal model employing said one of the heat transfer coefficients to determine the temperature of the electric motor comprises executing the thermal model employing said one of the heat transfer coefficients to determine temperatures at a plurality of nodes of the electric motor and determining a composite temperature for the electric motor based upon the temperatures at the plurality of nodes of the electric motor.

* * * * *